Patented Nov. 10, 1942

2,301,745

UNITED STATES PATENT OFFICE 2,301,745

DESTARCHED GLUTEN IN ROTARY DOUGHS

Theodore J. Otterbacher, Zion, Ill., assignor to Corn Products Refining Company, New York, N. Y., a corporation of New Jersey No Drawing. Application July 12, 1939,
Serial No. 283,985

6 Claims. (Cl. 99—90)

This invention relates to the production of food products particularly those containing wheat flour and/or fatty substances, such as lard, butter and hydrogenated oil; and the object of the invention is to improve food products of the types indicated, such as biscuits, cookies, bread, doughnuts and cakes by incorporating therewith relatively small quantities of purified and preferably destarched corn (maize) gluten, whereby, according to their character and constituents, the food products are (among other advantages) made more tender and short; the plastic flow of the dough, in the case of bakery goods particularly, is increased and its machinability improved; in the case of fat containing products, the common use of skim milk powders to mask or modify the taste of the grease may be omitted with considerable saving in cost; and the shelf-life of the products is increased.

By "purified corn gluten" is meant corn gluten, whether containing substantial quantities of starch or not, which is free from "steep water impurities," that is to say, from amino acids, sulfur dioxide, unstable and rapidly fermentable soluble proteins and complex organic sulfur compounds, which impurities are to be found in commercial gluten meal as a result of the steeping of the corn prior to milling and the separation therefrom of the starch, the presence of sulfur dioxide in the steeping and subsequent operations, the bacterial fermentation in the gluten settlers, the re-use of process liquors in the process and other features of the wet method of making starch from corn which tend to develop impurities of the character indicated. As a matter of convenience the term "steep water impurities" will be used to include all of these impurities, those developed later than the steeping operation as well as those developed during the steeping operation. The gluten, purified so as to be substantially free of these steep water impurities, in the manner to be hereinafter described, may contain, however, without detriment to its use in accordance with the present invention, small quantities of soluble carbohydrate substances, such as solubilized starch, dextrine and sugar and small quantities of oil and fibre as well as quantities, large or small, of starch; and the term "purified corn gluten" does not preclude the possibility of the presence of said last-mentioned non-protein substances. The objectionable steep water impurities may be removed by repeated washing of the gluten as it comes from the gluten settler; but the more economical and efficient way so far as applicant is aware, is to subject the gluten to a destarching process, by conversion of the starch to sugar through the action of malt, which operation not only makes possible the elimination of the starch (which is desirable when the gluten is used for certain purposes); but also, it has been discovered, has a disaggregating effect upon the gluten to the extent of making it more penetrable to liquids, so that when the starch sugar, which, of course, is soluble, is washed out, the steep water impurities are also removed with substantial completeness. The destarching and purifying operation is preferably carried on as follows:

To 100 gallons of gluten from the gluten settlers which may contain about 5.4% protein, by volume, is added an acid, such as hydrochloric acid, to adjust the pH to 5.7 and the gluten heated with live steam at 198° F. in order that the starch should be completely gelatinized. When this has been effected, the material is cooled with cold water to bring the temperature down to a proper malting temperature which is about 135° F. For this purpose 100 gallons of cold water may be added to the material. The malt extract is mixed with the gluten in amount of about ½ of a pound (3% of the total protein in the gluten) and the conversion carried on for about 5 hours at the temperature last mentioned. The material is then filtered, washed thoroughly with fresh water and spray dried.

Corn gluten so treated will be substantially free of steep water impurities, as defined above; and, assuming a 7% moisture content, may show the following ingredients on analysis:

|  | Percent |
|---|---|
| Protein | 78.0 |
| Starch | 1.5 |
| Solubles, mostly carbohydrates | 5.4 |
| Oil | 4.5 |
| Ash | 1.6 |
| Fibre | 2.0 |
| Moisture | 7.0 |
|  | 100.0 |

The purified gluten, prepared as above described or otherwise so as to eliminate steep water impurities, may be used in a large number of different products for a variety of purposes.

(1) It may be used as a diluent for wheat flour to increase tenderness and shortness. By tenderness is meant the ease with which the food product, a bakery product, for example, is broken up or crumbled into particles when masticated. By shortness is intended the capacity of the article, a cracker or a cookie, for example, to break off short. The ropy or filamentary character of the gluten or protein constituent of wheat tends to resist either type of breaking. The corn gluten is in the form of fine particles, more or less spherical, and when these particles are dispersed in the wheat flour dough, they act, probably, as fulcra over which the gluten strands are broken when the food product is subjected to pressure, thus increasing the effects described by the terms "tenderness" and "shortness." Certain types of wheat during certain seasons may be tougher than is desirable even for bread making, in which case the evil may be remedied and the bread made shorter and more tender by incorporating with the dough a small amount of purified corn gluten. The corn gluten may also be used in the production of biscuits, doughnuts, cookies, crackers, and the like where shortness and tenderness are particularly required.

(2) The purified corn gluten may be used also as a partial substitute for fat, which, of course, has a shortening effect on bakery goods.

(3) The purified corn gluten may be used to give a yellowish tinge to the food product, this being the natural color of the gluten, where such coloring is considered desirable, in the place of employing artificial coloring matter to which there are objections, legal and dietary.

(4) The corn gluten may be used as a substitute for skim milk powder, or milk in other form, which is commonly employed in fat containing food products to mask or lessen or modify the taste of the grease.

(5) When employed even in small quantities in bakery goods of various sorts, it adds considerably to the shelf-life of the goods. That is, it delays staleness.

(6) Used in wheat flour doughs corn gluten increases the rate of plastic flow of the dough when being fed continuously by machinery in commercial bakeries, for example. The natural filamentary or ropy character of wheat gluten tends to diminish the rate of plastic flow. This is corrected by the use of corn gluten in small quantities. The machinability of the dough, for example, the ease with which biscuits may be wire cut from the dough, is, for similar reasons, improved by the incorporation of corn gluten.

The invention is illustrated in the following specific examples which should be considered, however, as typical and informative and not limiting the invention to the particulars given; the intention being to cover all modifications and equivalent operations within the scope of the appended claims.

EXAMPLE 1.—*Doughnut mix*

The mix consists of the following ingredients in amounts, by weight, as follows:

| | Parts |
|---|---|
| (a) Wheat flour (grade and type suitable for doughnuts) | 25.5 |
| Skim milk powder | 2.5 |
| Baking powder | 1.0 |
| Nutmeg | $\frac{1}{32}$ |
| Destarched corn gluten | 1.5 |
| (b) Dextrose | 2.5 |
| Sucrose | 7.0 |
| Salt | 0.5 |
| (c) Corn oil | 1.5 |
| Oil of lemon | 1.32 |

The ingredients of each of the above groups are first separately mixed, the ingredients of (a) and (b) being first sifted and then mixed on a slow speed mixer, each for 10 minutes. The (b) ingredients are then added to the (c) ingredients and the combined mixture then added to the (a) ingredients and all mixed together for ten minutes longer in a slow speed mixer. Water is added as desired. For machine made doughnuts the amount of water is approximately 5 pounds of cold water to 10 pounds of the mix. For hand made doughnuts the amount of water may vary according to the individual taste.

The addition of the purified and, preferably, destarched corn gluten to the dough makes the doughnuts more tender and hence more palatable.

Generally speaking, the corn gluten should be used in amounts varying from about 1.6% to 4% corn protein based on the weight of the flour. If a purified corn gluten, not destarched, be used, the amount should be increased to compensate for the amount of starch in the gluten. If in the making of biscuits, for example, the amount of corn protein exceeds 4%, the leavening is prevented because the tenderness of the dough makes it break under the pressure of the carbon dioxide. The examples here given, assume the small amount of starch indicated by the above analysis:

EXAMPLE 2.—*Short bread*

| | Parts |
|---|---|
| Wheat flour | 200 |
| Invert sugar | 165 |
| Hard fat (hydrogenated oil) | 35 |
| Salt | 3 |
| Baking soda | 5 |
| Milk or water | 50 |
| Destarched corn gluten | 4–10 |

EXAMPLE 3.—*Wire cut biscuit*

In the production of this type of bakery goods, the dough is formed into the desired shape in a dough mold and then cut by a wire as the dough is extruded from the mould. In this case the addition of the purified corn gluten, in addition to giving shortness and tenderness, improves the flow and machinability of the dough.

The following is a preferred formula:

| | Parts |
|---|---|
| Wheat flour | 200 |
| Cane sugar | 100 |
| Dextrose | 35 |
| Hard fat | 55 |
| Eggs | 10 |
| Salt | 2 |
| Baking soda | 2 |
| Cream of tartar | 1 |
| Ammonium bicarbonate | 0.5 |
| Water or skim milk | 60 |
| Destarched gluten | 4 to 10 |

EXAMPLE 4.—*Graham crackers*

| | Parts |
|---|---|
| (a) Dextrose | 30 |
| Cane sugar | 20 |
| Molasses | 20 |
| Invert sugar | 10 |
| Water | 70 |
| (b) Shortening | 30 |
| (c) Bolted wheat flour | 150 |
| Graham flour | 50 |
| Baking soda | 2 |
| Ammonium bicarbonate | 2 |
| Salt | 3 |
| Destarched gluten | 4 to 10 |

Ingredients (a) are heated to 200° F. and ingredients (b) and (c) added thereto and the batch mixed until a clear dough is produced.

This application is a continuation in part of copending application, Serial No. 219,911, filed July 18, 1938.

I claim:

1. Process of treating a fat containing bakery food product to mask the grease taste which consists in incorporating in said product a small quantity of corn gluten purified of its steep water impurities.

2. Process of treating a fat containing bakery food product to mask the grease taste which consists in incorporating in said product a small quantity of destarched corn gluten purified of its steep water impurities.

3. Process for the production of bakery goods from wheat flour dough to increase the rate of flow of the dough and the tenderness and shortness of the bakery goods made therefrom, which comprises incorporating with the dough a small quantity of corn gluten substantially free from steep water impurities.

4. Process for the production of bakery goods from wheat flour dough to increase the rate of flow of the dough and the tenderness and shortness of the bakery goods made therefrom, which comprises incorporating with the dough corn gluten, substantially free from steep water impurities, in such amount that the corn protein is between 1.6% and 4.0%, by weight, of the wheat flour.

5. Process for the production of bakery goods from wheat flour dough containing a fat, which comprises incorporating with the dough a small quantity of corn gluten, substantially free from steep water impurities, to mask the taste of the fat.

6. Process for the production of bakery goods from wheat flour dough containing a fat, which comprises incorporating with the dough a small quantity of corn gluten, substantially free from steep water impurities in such an amount that the corn protein is between 1.6% and 4.0%, by weight, of the wheat flour, whereby the taste of the fat is masked.

THEODORE J. OTTERBACHER.